Dec. 11, 1951 K. KIRBY 2,578,076
CHECK VALVE
Filed May 8, 1945 3 Sheets-Sheet 1
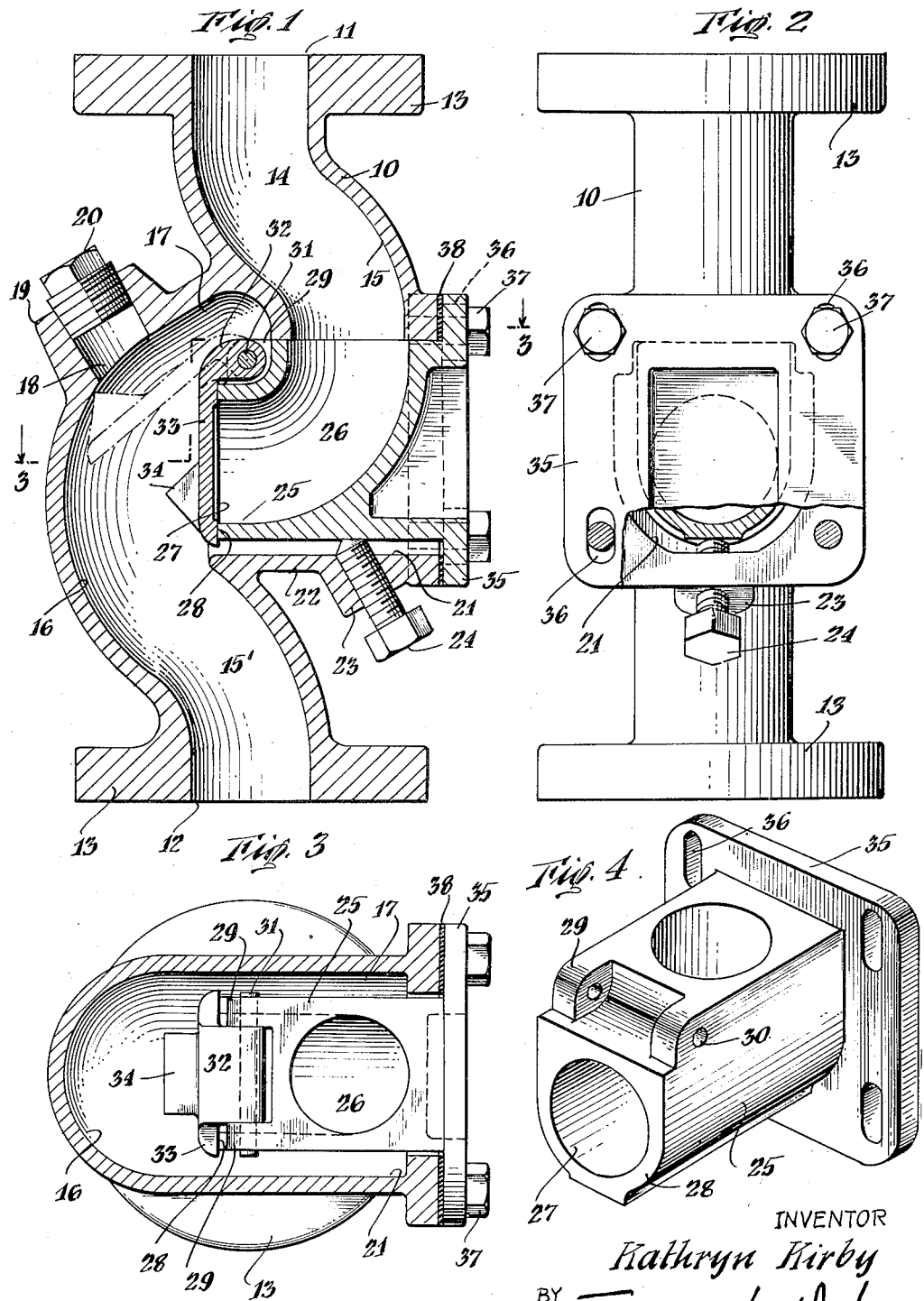
INVENTOR
Kathryn Kirby
BY Townsend + Decker
ATTORNEYS.

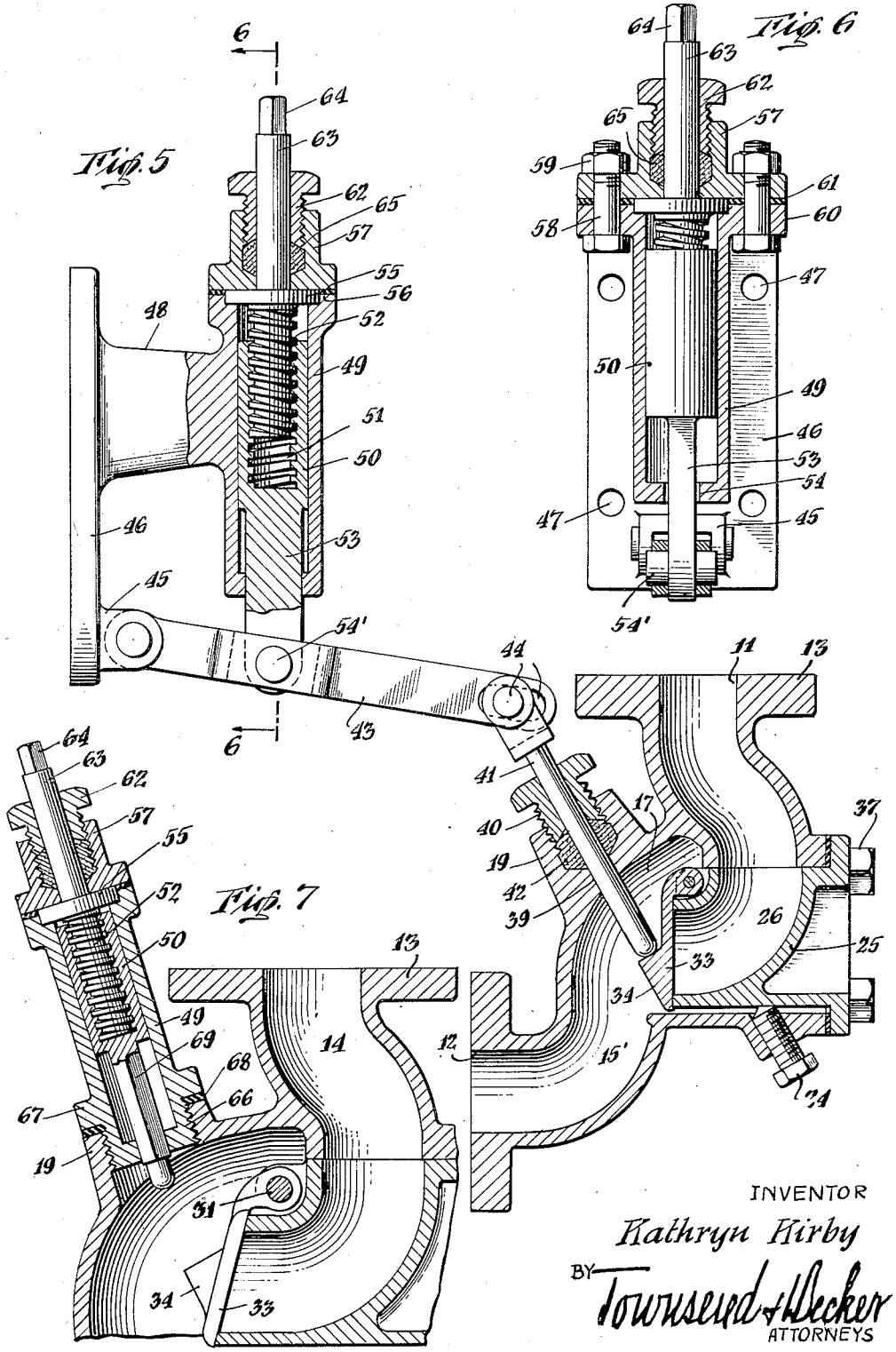

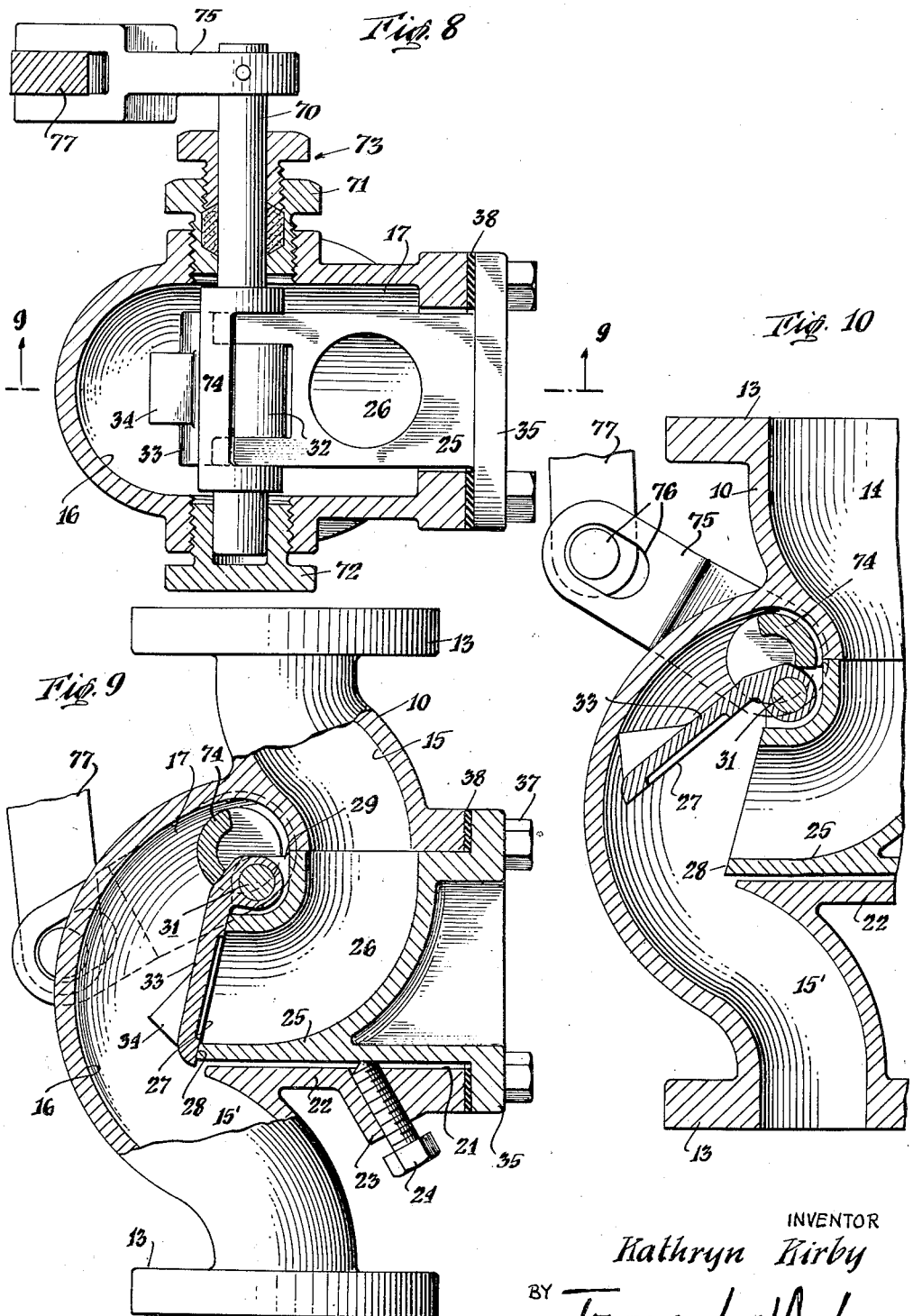

Patented Dec. 11, 1951

2,578,076

UNITED STATES PATENT OFFICE 2,578,076

CHECK VALVE

Kathryn Kirby, New York, N. Y., assignor to W. Harrison Young, Inc., New York, N. Y., a corporation of New York Application May 8, 1945, Serial No. 592,656

2 Claims. (Cl. 251—123)

The present invention has for its principal object the production of a valve of simple construction which may be conveniently and effectively employed in scuppers on ships or in sinks, drains, toilets and the like.

A further object of the invention is the production of a valve of the above character in which the valve closure member normally remains in closed position by the action of gravity but is so constructed as to permit the passage of a fluid through the valve by pressure exerted against the closure member in one direction while pressure thereagainst in the opposite direction is resisted and acts to immediately force said valve closure member into tightly closed position against its valve seat.

A further object of the invention is the production of a valve in which a removable plug or insert is employed which may be inserted in the valve body and removed bodily as a unit and which includes the intermediate portion of the complete passageway through the valve extending from inlet port to outlet port and which also carries the valve closure member per se thereby facilitating inspection of damaged or worn parts and repair or replacement of such parts when necessary as well as the regrinding or refacing of the valve seat for said closure member or the closure member itself when occasion requires.

A further object of the invention is the production of a valve of the character referred to which shall contain means for tightly clamping the plug or unit carrying the valve closure member in proper and operative position within the valve body and in alignment with the inlet passageway in order to prevent leakage.

Still a further object of the invention is the production of a valve of the general type indicated above which shall be provided with a regulating device for regulating or controlling the position of the valve closure member.

Other and further objects and advantages of the invention will appear as the description thereof proceeds, the invention consisting in the novel valve and combinations of parts thereof hereinafter more particularly described and then specified in the claims.

In the accompanying drawings illustrating a practical embodiment of the invention:

Fig. 1 is a section taken through the valve.

Fig. 2 is a side elevation thereof.

Fig. 3 is a horizontal section on the line 3—3 of Fig. 1.

Fig. 4 is a perspective view of a removable plug or insert to which the valve closure member is pivoted.

Fig. 5 is a sectional view (partly in elevation) taken through the valve body and through the position regulating device for the valve closure member.

Fig. 6 is a vertical cross-section on the line 6—6 of Fig. 5.

Fig. 7 is a sectional view of a modification of the regulating device shown in Fig. 5.

Fig. 8 is a sectional view showing a further modification of the regulating device in elevation.

Fig. 9 is a horizontal section on the line 9—9 of Fig. 8 and

Fig. 10 is fragmentary section somewhat similar to Fig. 9 showing the modified form of regulating device in inoperative position.

Referring in detail to the several figures of the drawings:

The body of the valve of the invention is indicated at 10. It may be cast of any suitable metal or metal alloy which, however, is preferably inert to any corrosive or other deleterious action by salt water or acid. Said body is provided with an inlet port 11 and an outlet port 12 which ports preferably are in substantially vertical alignment although the relative position of the outlet port with respect to that of the inlet port might be varied and still remain within the scope of the invention, as for instance, the outlet port may lie in a plane transverse to the plane of the inlet port as illustrated in Fig. 5. The ends of said body may be provided with conventional attaching flanges 13 preferably integral therewith and of any desired configuration and which are supplied for attaching said valve body to other members. Said flanges 13 may be faced, drilled or undrilled as required.

Inlet port 11 communicates with an inlet passageway 14 having oppositely disposed curvilineal or arcuate walls 15 joined together by vertically extending straight walls as shown in Fig. 2. The outlet port 12 communicates with an outlet passageway 15' also having oppositely disposed curvilineal or arcuate walls 16 the direction of the curvature of which may follow generally the direction of the curvature of the walls 15 in the preferred form of the invention. In some cases, however, the direction of the curvature of said arcuate walls 16, as compared with that of walls 15, will vary, particularly if the outlet port lies in a plane transverse to that of the inlet port as shown in Fig. 5. The outlet passageway 15' terminates at its upper end in a recess or chamber 17 within the body 10. Said body is also provided with an opening 18 extending therethrough and with an upstanding interiorly screw-threaded boss 19 surrounding said opening, said boss being adapted to receive a headed screw-threaded stopper or closure 20 for normally closing the opening 18.

The body 10 is also provided with an opening 21 extending laterally or horizontally therethrough and preferably centrally thereof and with a horizontally disposed extension or flange 22 integral with that portion of the body constituting the wall of the outlet passageway 15' and said extension may form the lower wall of said opening 21. Said flange 22 is supplied with an inclined, interiorly screw-threaded hollow boss 23 surrounding an opening extending through the flange 22 and said boss receives a headed, positioning set screw or screw-threaded bolt 24.

A removable plug or insert of unit construction is indicated at 25. It may be either round or rectangular in configuration or of any other configuration desired and found convenient. This insert or plug is concealed within the body 10 in that it is received within the opening 21 the walls of which conform in configuration to the walls of said insert or plug. To facilitate insertion within or removal from said opening, said plug may be conveniently slid on said extension 22. Said insert 25 is provided with an intermediate elbow-type passageway 26 the upper end of which is adapted to register with the lower end of the inlet passageway 14 and to form a fluid-tight fit therewith. The intermediate passageway 26 constitutes a continuation of the inlet passageway 14 when the plug 25 has been inserted in proper and operative position within the body 10. Said intermediate passageway also is provided with an outlet port or discharge opening 27 communicating with the outlet passageway 15' and it is further provided with a valve seat 28 forming a flat face surrounding its discharge opening 27 and adapted for engagement by a valve closure member to be presently described.

The plug or insert 25 includes bearing members 29 having aligned bearing openings 30 receiving a pin or pintle 31 extending through a leg or flange 32 of a vertically extending plate-like valve closure member 33. Said valve closure member preferably is of the "flap" type and it extends downwardly in a plane transverse to the general plane of the inlet port 11 and it is suspended by its pin or pintle 31. If so desired, said closure member and its valve seat 28 may be somewhat inclined from the vertical as shown in Fig. 7. In both cases, however, said valve closure member 33 is normally retained in closed position against its seat 28 by the action of gravity. It will be noted, also, that although said closure member 33 is carried by said plug 25, it is positioned exteriorly thereof so as to be readily accessible when the plug is removed from the body 10. The valve closure member also carries a stop 34 adapted to limit its outward swinging movement on pivot 31 as indicated in dotted lines in Fig. 1. For insuring a tight connection between the lower edge of the wall of the inlet passageway 14 and the upper edge of the wall of the intermediate passageway 26 the set screw or screw-threaded bolt 24 which is adapted to bear against the lower wall of the plug or insert 25 is tightened to apply upward pressure thereagainst and force the plug upwardly and bodily against the wall of the inlet passageway.

For further tightening the plug or insert 25 in proper and operative position within the body 10 a clamping plate 35 preferably integral with the body, as shown, and having vertical slots 36 therein has been provided. Said slots receive headed screw-threaded bolts 37 which are screwed within screw-threaded openings with which the body is provided. For the purpose of providing a fluid-tight connection between the parts it is preferred to interpose a washer 38 of any suitable compressible material between the plate 35 and the body of the valve.

From the foregoing description it will be obvious that the valve closure member 33 normally remains in closed position by the action of gravity and that any refluence of fluid in outlet passageway 15' merely acts to more tightly press said valve closure member into tight engagement with its seat 28 and effectively prevent the return of fluid through the outlet port 12 and into the intermediate passageway 26 and inlet passageway 14. When a liquid or foreign matter or both pass into the intermediate passageway 26, the pressure thereof will force the closure member 33 to swing open on its pivot and permit the delivery of the liquid and foreign matter into the outlet passageway 15' after which the closure member will automatically swing into closed position against its seat 28.

The opening 18 in the valve body 10 hereinbefore referred to and which is normally closed by the closure 20 has been provided to permit ready access to the valve closure member 33 when necessary without the necessity of the removal of the plug or insert 25. Said opening 18 also permits access to the chamber 17 and outlet passageway 15' in the event of the clogging thereof. Another advantageous feature of the invention lies in the fact that should a small article of value such as a ring be inadvertently dropped within the inlet passageway 14, it will be trapped by the valve closure member 33 and may be readily recovered by removal of the plug or insert 25.

It is sometimes found necessary either to hold the valve closure member in closed position against its seat 28 or to limit the degree of opening of said member and thereby regulate the amount of flow of fluid through the valve. An adjustable position regulator for said valve closure member accordingly has been provided for these purposes and is illustrated in Figs. 5 to 7 inclusive.

Referring to Figs. 5 and 6, the interiorly screw-threaded opening in the boss 19 terminates at its lower end in an opening 39 of restricted size which communicates with the chamber 17 and outlet passageway 15'. The opening in the boss receives a headed screw-threaded nut 40 provided with a longitudinal opening extending therethrough which slidably receives a position-regulating rod 41 which slidably interfits with the restricted opening 39 and the end of which is adapted to engage the stop 34 of the valve closure member 33. Packing material 42 is carried within the opening in the boss 19 and may be compressed as desired by the nut 40 so that a stuffing box construction is provided for the slidable rod 41. In Fig. 5 the end of the rod is shown as holding the valve closure member 33 against movement and in closed position.

The upper end of the rod 41 is pivoted to one end of a link 43 by a pin and slot connection 44 while the other end of said link is pivoted to a bearing stud 45 as shown. Said bearing stud is carried by a supporting plate 46 having openings 47 for the reception of bolts or screws for attaching the plate to any suitable supporting or stationary member (not shown). An arm 48 is attached to said supporting plate 46 and said arm carries a sleeve or cylinder 49 which receives a sliding and reciprocating head or block 50. Said head or block is interiorly recessed and screw-threaded as indicated at 51 and receives a screw-threaded shaft or worm 52. A squared extension 53 is carried by the lower end of said head 50 and extends through and slidably interfits with a squared slot 54 in the lower wall of the sleeve or cylinder 49. The lower end of extension 53 is pivoted as by pivot 54' to the link 43. The upper end of the screw-threaded shaft 52 is fastened to or carries a supporting disk 55 rotatably seated on a shoulder 56 with which the sleeve 49 is provided.

A flanged cap or bonnet is indicated at 57 and the flanges thereof may be detachably connected by means of headed bolts 58 and nuts 59 to a flange or flanges 60 with which the upper end of the sleeve or cylinder 49 is provided. A compressible washer 61 may also be interposed between the parts so connected. The body of the cap or bonnet 57 is interiorly recessed and screw-threaded and receives a headed and threaded nut 62 provided with a longitudinal opening receiving a driving or operating shaft 63 journalled therein and connected at its lower end to the supporting disk 55. The upper end of shaft 63 is squared or headed as at 64 for the reception of a wrench or the like. A compressible packing 65 is also carried within the opening in the cap 57 and it may be compressed by manipulation of the nut 62.

From the foregoing description it is obvious that rotation of the operating shaft 63 as by a wrench or by power driven means will rotate the shaft or worm 52 to effect vertical movement in the desired direction of the head or block 50 within the sleeve or cylinder 49. Rotation of said block or head is prevented by engagement of the squared extension 53 with the slot 54. Movement of the block or head 50 rocks link 43 because of the pivoted connection 54' and the pin and slot connection 44 between the link 43 and the position-regulating rod 41 results in movement of said rod towards or from the closure member 33 as the case may be. Accordingly, the closure member may be held in extreme closed position as shown in Fig. 5 or its opening movement may be limited to the extent desired.

The construction of the regulating device shown in Fig. 7 is very similar to that shown in the upper right-hand portion of Fig. 5 so that many of the parts bear the same reference numerals as the corresponding parts in Fig. 5 and a description thereof accordingly will be found to be repetitious and superfluous. In said Fig. 7 however, the opening in the boss 19 is screw-threaded throughout its length and said opening receives the lower end of the sleeve or cylinder 49 which is screw-threaded and which is indicated at 66. The said sleeve 49 is also provided with a flange 67 for engagement with the outer end of the boss 19 and a compressible material 68 may be interposed between the parts so engaged. In this case the position-regulating rod for engagement with the valve closure member 33 is indicated at 69 and is attached to or forms a part of the head or block 50. Said rod 69 is squared, as illustrated, and it slidably interfits with a slot or opening of similar configuration in the base of the sleeve or cylinder 49 to prevent rotation of the head or block 50 when the screw-threaded shaft or worm 52 is rotated.

The modification illustrated in Figs. 8 to 10 inclusive includes a construction for holding the valve closure member 33 in tightly closed position against its seat and excludes the adjustable mechanism shown in Figs. 5 to 7 inclusive by means of which the degree of opening of said valve closure member may be limited. In said Figs. 8 to 10 inclusive, a rotatable shaft 70 is shown extending transversely through the valve body and chamber 17 and adjacent the valve closure member and above its leg or flange 32. Said shaft is journalled in hollow exteriorly screw-threaded nuts 71 and 72 which are screwed within screw-threaded aligning openings in opposed walls of the valve body, said nut 71 adjacent the driven end of said shaft also having associated therewith a stuffing box construction receiving said shaft and indicated generally at 73. Said shaft 70 is so constructed or milled as to provide a curved locking member 74 rotatable therewith and the free end of which is adapted to bear against the valve closure member 33 to lock it in closed position as shown in Fig. 9 and to thereby prevent the flow of fluid from the intermediate passageway 26 to the outlet passageway 15'.

Secured to the end of said shaft 70 is the shank of a forked member 75 which is connected by a pin and slot connection 76 to a driving shaft 77. Said shaft 77 may be actuated by any suitable power to partially rotate shaft 70. As is obvious, partial rotation only of shaft 70 is necessary to throw the curved locking member 74 from inoperative position, as shown in Fig. 10, to operative position and into locking engagement with the valve closure member as shown in Fig. 9. Manifestly, rotation of shaft 70 in the opposite direction will again return the locking member to inoperative position.

The invention claimed is:

1. A valve comprising a body having an opening extending horizontally therein and provided with a vertically extending inlet passageway and an outlet passageway spaced from said inlet passageway, a removable plug received within said opening and having an unobstructed intermediate passageway registering with said inlet passageway and communicating with said outlet passageway, said plug terminating at its lower end in a valve seat, a valve closure member of the flap type suspended from and pivoted to said plug exteriorly of said intermediate passageway and normally retained in closed position against said seat by the action of gravity and adapted to be opened by liquid in said intermediate passageway exerting pressure laterally against said valve closure member and means supported by and extending through said body and exerting pressure upwardly against said plug to force it into close engagement with the lower end of said inlet passageway and to insure a tight connection between said inlet and intermediate passageways.

2. A valve comprising a body having an opening extending horizontally therein and provided with a vertically extending inlet passageway and an outlet passageway spaced from said inlet passageway, a flange extending outwardly and freely from said body and forming a portion of the lower wall of said opening, a removable plug loosely received within said opening and having an unobstructed intermediate passageway registering with said inlet passageway and communicating with said outlet passageway, said plug being provided with a valve seat at its lower end, a valve closure member of the flap type suspended from and pivoted to said plug exteriorly of said intermediate passageway and normally retained in closed position against said seat by the action of gravity and adapted to be opened by liquid in said intermediate passageway exerting pressure laterally against said valve closure member, a screw-threaded bolt extending upwardly and threaded through the aforesaid flange and exerting pressure upwardly against said plug to force it into close engagement with the lower end of said inlet passageway so as to insure a fluid-tight connection between said inlet and intermediate passageways a locking plate carried by said plug and engaging said flange and provided with slots therein and bolt members extending through said slots and threaded into said body for preventing removal of said plug from the aforesaid opening.

KATHRYN KIRBY.

REFERENCES CITED

The following references are of record in the file of this patent:

UNITED STATES PATENTS

| Number | Name | Date |
|---|---|---|
| 277,277 | Carter | May 8, 1883 |
| 290,314 | Blessing | Dec. 18, 1883 |
| 483,635 | Prince | Oct. 4, 1892 |
| 709,262 | Gold | Sept. 16, 1902 |
| 911,353 | Williams | Feb. 2, 1909 |
| 955,931 | Woodall | Apr. 26, 1910 |
| 1,036,378 | Thurman | Aug. 20, 1912 |
| 2,272,960 | Young | Feb. 10, 1942 |
| 2,285,324 | Bennett | June 2, 1942 |
| 2,446,767 | James | Aug. 10, 1948 |

FOREIGN PATENTS

| Number | Country | Date |
|---|---|---|
| 11,142 | Great Britain | 1906 |
| 20,761 | Great Britain | Nov. 2, 1895 |